United States Patent
Lee et al.

(10) Patent No.: US 8,690,235 B2
(45) Date of Patent: Apr. 8, 2014

(54) DEVICE FOR OPERATING SUNROOF IN VEHICLE

(75) Inventors: Hoyul Lee, Seongnam-si (KR);
Chang-Jin Yoon, Suwon-si (KR)

(73) Assignees: Hyundai Motor Company, Seoul (KR);
Inalfa Roof Systems Korea Ltd.,
Hwaseong-Si (KR)

(*) Notice: Subject to any disclaimer, the term of this patent is extended or adjusted under 35 U.S.C. 154(b) by 0 days.

(21) Appl. No.: 13/555,939

(22) Filed: Jul. 23, 2012

(65) Prior Publication Data
US 2013/0145871 A1    Jun. 13, 2013

(30) Foreign Application Priority Data
Dec. 12, 2011   (KR) .................. 10-2011-0132871

(51) Int. Cl.
*B60J 7/00*   (2006.01)
(52) U.S. Cl.
USPC ........................................ 296/214; 296/223
(58) Field of Classification Search
USPC .................................. 296/214, 223
See application file for complete search history.

(56) References Cited

U.S. PATENT DOCUMENTS

| | | | |
|---|---|---|---|
| 4,531,777 A * | 7/1985 | Bienert et al. | 296/223 |
| 4,811,985 A * | 3/1989 | Kruger et al. | 296/214 |
| 7,891,730 B2 * | 2/2011 | Rikkert | 296/223 |
| 8,439,433 B2 * | 5/2013 | Kim et al. | 296/214 |

FOREIGN PATENT DOCUMENTS

| | | | |
|---|---|---|---|
| EP | 1588882 | * | 10/2005 |
| KR | 2003-0032668 A | | 4/2003 |
| KR | 10-0569913 B1 | | 4/2006 |
| KR | 10-2008-0051431 A | | 6/2008 |

* cited by examiner

*Primary Examiner* — Dennis Pedder
(74) *Attorney, Agent, or Firm* — Morgan, Lewis & Bockius LLP

(57) ABSTRACT

An operating device for a sunroof of a vehicle may include a motor housing disposed at a rear side of a roof panel and a mounting space, an operating motor disposed at one side of the motor housing and a worm inserted into the mounting space, a gear unit rotatably disposed in the mounting space engaged with the worm and is rotated by the operating motor, a glass cable connected to the gear unit and to a moving glass disposed outside of the roof panel to move the moving glass, a sun shade cable connected to the gear unit at an upper side of the glass cable and is connected to the sun shade inside the roof panel to move the sun shade, and a locking unit disposed on the motor housing corresponding to the gear unit and selectively locks the gear unit such that the cable is separately operated.

11 Claims, 9 Drawing Sheets

DEVICE FOR OPERATING SUNROOF IN VEHICLE

CROSS-REFERENCE TO RELATED APPLICATION

The present application claims priority of Korean Patent Application Number 10-2011-0132871 filed Dec. 12, 2011, the entire contents of which application is incorporated herein for all purposes by this reference.

BACKGROUND OF INVENTION

1. Field of Invention

The present invention relates to an operating device for a sunroof of a vehicle. More particularly, the present invention relates to a sunroof operating device for a vehicle that uses one motor to operate a moving glass and a sun shade in a panorama sunroof that is disposed on a roof panel of a vehicle.

2. Description of Related Art

Generally, a sunroof is disposed on a roof panel of a vehicle to partially open/close the roof panel.

The sunroof ventilates air of the vehicle interior room and offers an open feeling, and is processed through heat treatment to withstand strong sunlight, cuts off ultraviolet rays and infrared rays, and is made of a high performance material such that an occupant is not wounded by glass pieces.

Meanwhile, a panorama sunroof is being applied to increase the open feeling, and offers a convertible feeling by forming glass along most of the roof panel including the front seat portion as well as the rear seat portion.

The panorama sunroof has a sun shade that is disposed inside the vehicle, the sun shade is opened to circulate air of the vehicle, and is closed to prevent sunlight and to maintain the interior room temperature.

Here, the sun shade is opened or closed by winding or unwinding a roller that is disposed at both ends of the panorama sun roof.

The panorama sunroof includes a cable that is respectively connected to a moving glass and a sun shade, a wire that uses an operating motor to push or draw an operating wire that is connected to the cable, and an operating device for moving the moving glass and the sun shade.

However, the conventional panorama sunroof has two separate operating devices for moving the moving glass and the sun shade and therefore additional mounting space is necessary which reduces the interior space, and the layout is complicated.

Also, because the operating device for the moving glass and the operating device for the sun shade are applied thereto, the production cost is increased.

The above information disclosed in this Background section is only for enhancement of understanding of the background of the invention and therefore it may contain information that does not form the prior art that is already known in this country to a person of ordinary skill in the art.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for an operating device for a sunroof of a vehicle having advantages of using one motor to operate respective cables that are connected to a sun shade and a moving glass to save production cost, reduce mounting space, and improve design freedom.

Various aspects of the present invention provide for an operating device for a sunroof of a vehicle that may include a motor housing that is disposed at a rear side of a roof panel and a mounting space having a penetration hole formed at one side of a lower surface, an operating motor that is disposed at one side of the motor housing and a worm that is disposed at a rotation shaft that is inserted into the mounting space, a gear unit that is rotatably disposed in the mounting space of the motor housing to be engaged with the worm of the operating motor and is rotated by the torque of the operating motor, a glass cable that is connected to the gear unit at an upper portion of the motor housing and is connected to a moving glass that is disposed outside of the roof panel to move the moving glass, a sun shade cable that is connected to the gear unit at an upper side of the glass cable and is connected to the sun shade that is disposed inside the roof panel to move the sun shade according to the operation of the gear unit, and a locking unit that is disposed at an upper surface of the motor housing corresponding to the gear unit and selectively locks the gear unit such that the cable is separately operated.

The gear unit may include a ring gear that is disposed at an interior circumference side of the mounting space and is engaged with the worm, a sun gear that is disposed at a rotation center of the ring gear and a first cable gear that is formed at one end portion that protrudes to the penetration hole to be engaged with the sun shade cable, at least one planetary gear that is disposed between the ring gear and the sun gear with a predetermined distance to be engaged with the ring gear and the sun gear, and a carrier that supports the planetary gear in a condition that one end of the sun gear is rotatably inserted and a second cable gear that is engaged with the glass cable is formed at one surface to protrude to the penetration hole of the mounting space.

The first cable gear may be disposed at a higher position than the second cable gear at an upper portion of the motor housing.

A plurality of the glass cables and the sun shade cables can be prepared, and they are respectively connected to both sides of the moving glass and the sun shade to be engaged at both sides of the first cable gear and the second cable gear.

The glass cable and the sun shade cable may have a screw shape spiral protrusion that is integrally formed on the exterior circumference thereof along the length direction to be respectively engaged with the first cable gear and the second cable gear.

The glass cable movably may penetrate the upper portion of the motor housing, a first plate having a mounting hole corresponding to the penetration hole is disposed thereon, and a second plate that the sun shade cable movably penetrates is disposed at an upper portion of the first plate.

The locking unit may include a locker that is slidably disposed on the mounting hole across the carrier and the sun gear that protrudes upward of the motor housing to selectively lock the sun gear with the carrier, an operating portion that is connected to one end of the locker to slidably move the locker on the mounting hole in one direction, and an elastic member that is interposed between the mounting hole and the other end portion of the locker to apply an elastic force to the locker.

The first locking gear that is formed on the sun gear and the second locking gear that is formed on the carrier may be disposed between the first cable gear and the second cable gear.

The locker may include a first hook protrusion that is formed at one end inner side corresponding to the first locking gear and a second hook protrusion that is formed at the other end inner side corresponding to the second locking gear.

The first hook protrusion may have at least one first hook that is engaged with the first locking gear.

The second hook protrusion may have a hook that is engaged with the second locking gear.

The operating portion may be a solenoid type that moves the locker toward the elastic member depending on the power supply.

The elastic member may be a coil spring of which one end thereof is supported by the mounting hole and the other end thereof is supported by the locker.

As described above, in an operating device for a sunroof of a vehicle according to various aspects of the present invention, one motor is used to operate each cable that is connected to the moving glass and the roof panel in the panorama sunroof that is disposed on the roof panel of the vehicle such that the cost is reduced, the mounting space is secured to improve design freedom, and an interior space is used efficiently.

Also, the layout of each cable that is connected to the moving glass and the sun shade is reduced, a gear unit for transferring torque of a motor is a type of a planetary gear device to improve the reliability thereof, the overall system is light in weight, and productivity is improved.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
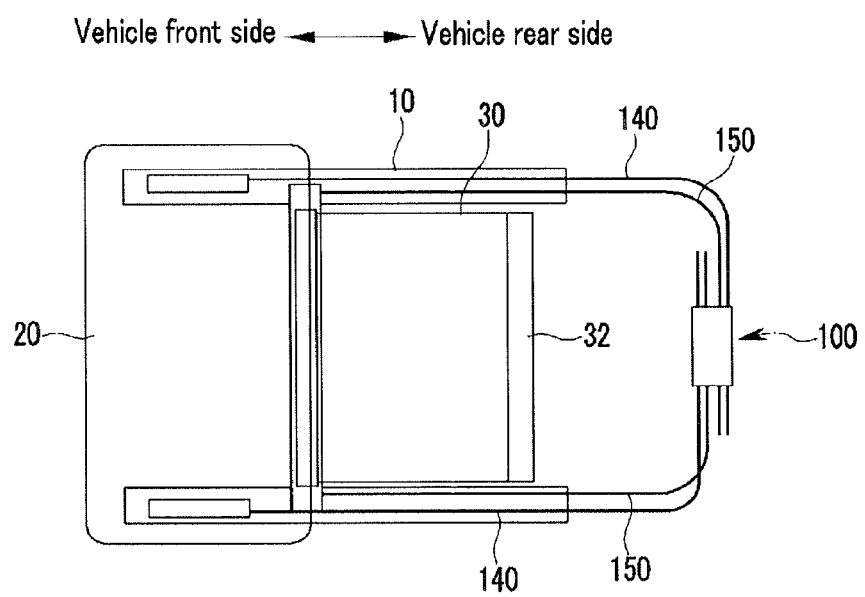
FIG. 1 is a schematic diagram of an exemplary vehicle sunroof including an operating device according to the present invention.
Figure 2:
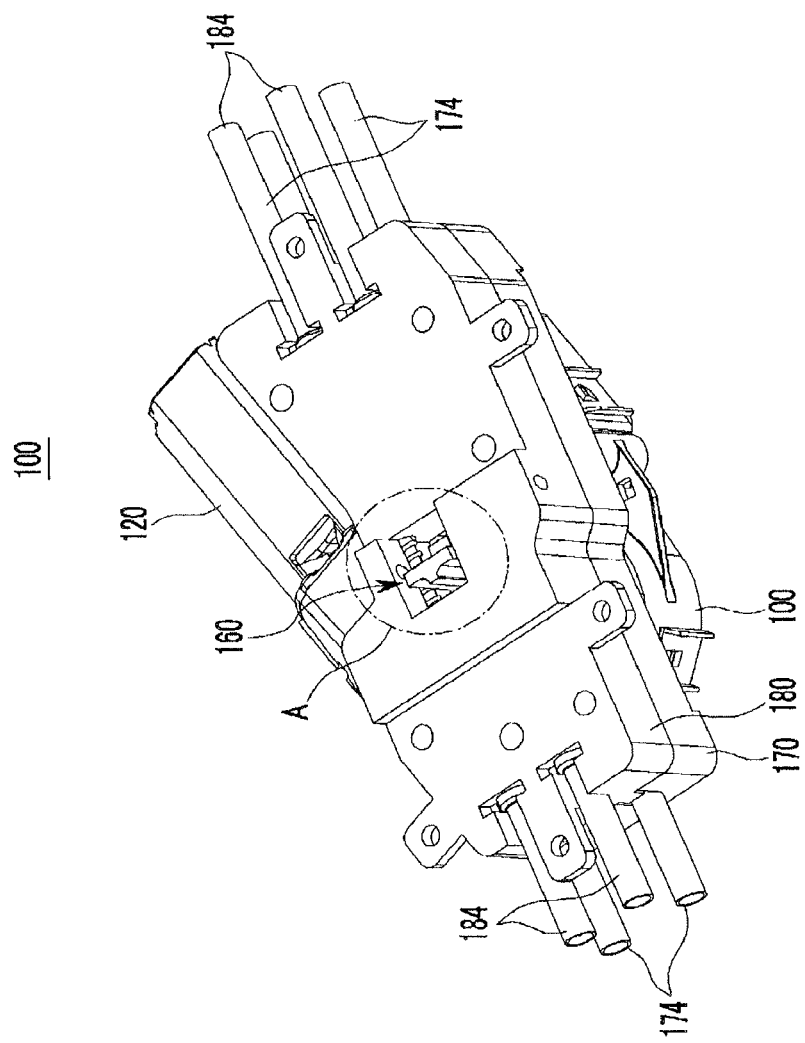
FIG. 2 is a perspective view of an exemplary operating device for a sunroof of a vehicle according to the present invention.
Figure 3:
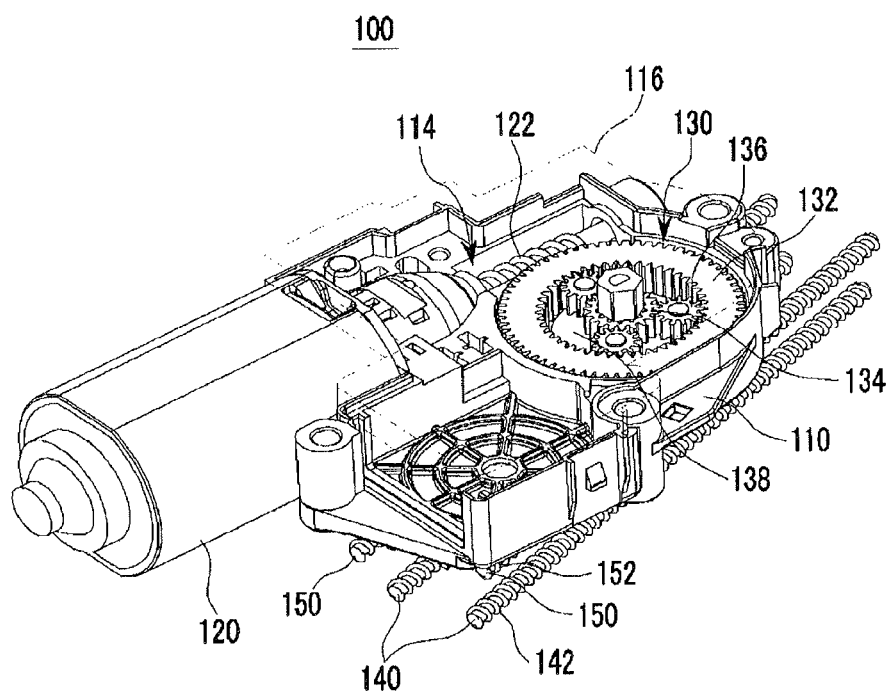
FIG. 3 is a rear transparent perspective view of an exemplary operating device for a sunroof of a vehicle according to the present invention.
Figure 4:
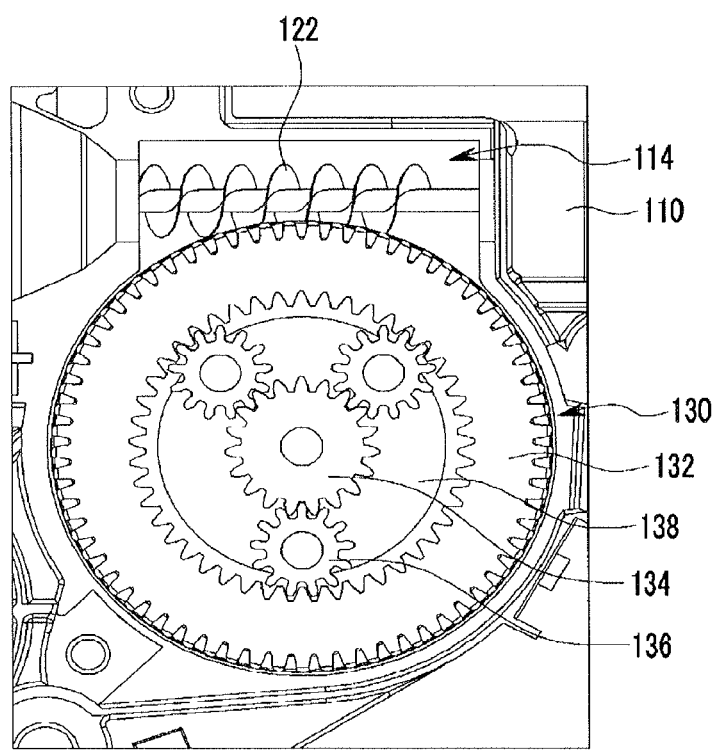
FIG. 4 is a front view of an exemplary gear unit that is applied to an operating device for a sunroof of a vehicle according to the present invention.
Figure 5:
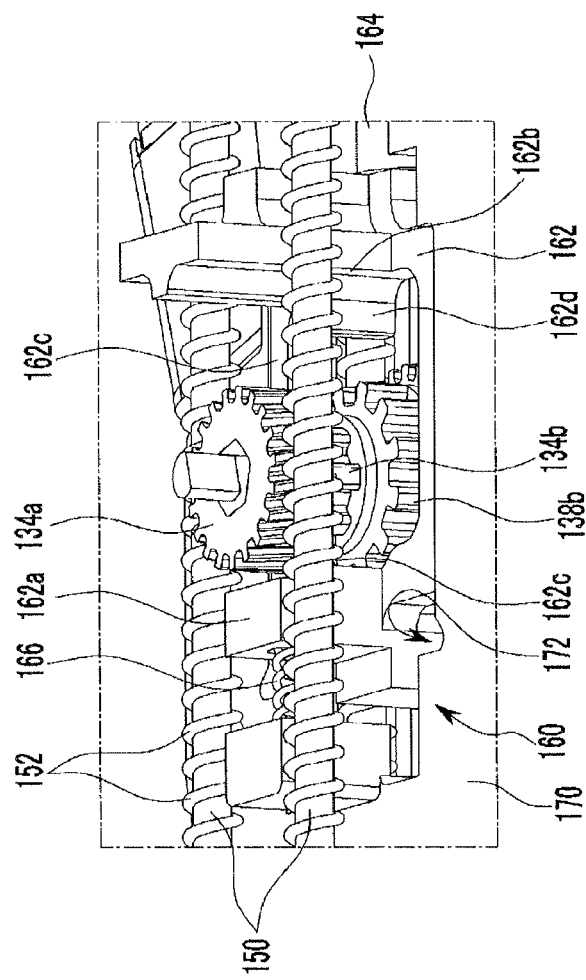
FIG. 5 is a perspective view showing an enlarged portion of "A" of FIG. 2.

FIG. 1 is a schematic diagram of vehicle sunroof to which an operating device according to various embodiments of the present invention is applied, FIG. 2 is a perspective view of an operating device for a sunroof of a vehicle according to various embodiments of the present invention, FIG. 3 is a rear transparent perspective view of an operating device for a sunroof of a vehicle according to various embodiments of the present invention, FIG. 4 is a front view of a gear unit that is applied to an operating device for a sunroof of a vehicle according to various embodiments of the present invention, and FIG. 5 is a perspective view showing an enlarged portion of "A" of FIG. 2.

A sunroof of a vehicle having an operating device 100 for a sunroof of a vehicle according to various embodiments of the present invention, as shown in FIG. 1, is used to operate a moving glass 20 that is slidably disposed outside a roof panel 10 of a vehicle and a sun shade 30 that opens/closes the interior room of the vehicle by winding or unwinding a roller 32 inside the roof panel 10.

Here, an operating device 100 for a sunroof of a vehicle according to various embodiments of the present invention uses one motor to operate each of cables 140 and 150 that are connected to the moving glass 20 and the shade 30 in a panorama sunroof that is disposed on the roof panel 10 of a vehicle such that the cost is reduced and the mounting space is secured to improve design freedom and interior space usage efficiency.

For this, an operating device 100 for a sunroof of a vehicle according to various embodiments of the present invention, as shown in FIG. 2 to FIG. 5, includes a motor housing 110, an operating motor 120, a gear unit 130, a glass cable 140, a sun shade cable 150, and a locking unit 160.

Firstly, the motor housing 110 is disposed at a rear side of the roof panel, 10 and an operating space 114 having a penetration hole 112 is formed at one side.

Here, the glass cable 140 penetrates an upper portion of the motor housing 110, and a first plate 170 having a mounting hole 172 is disposed corresponding to the penetration hole 112.

Further, a second plate 180 that the sun shade cable 150 movably penetrates is disposed at an upper portion of the first plate 170.

Here, cable tubes 174 and 184 is disposed at each end portion of the first plate 170 and the second plate 180, and the cables 140 and 150 are respectively inserted through the cable tubes 174 and 184.

In various embodiments, the operating motor 120 is disposed at one side of the motor housing 110, and a worm 122 is disposed on a rotation shaft thereof that is inserted into the operating space 114.

The operating motor 120 can be a servo motor that can control a rotation direction and amount of rotation of the rotation shaft thereof.

The gear unit 130 is rotatably disposed in the operating space 114 of the motor housing 110 to be engaged with the worm 122 of the operating motor 120, and receives a torque of the operating motor 120 to be rotated.

Meanwhile, the glass cable 140 is connected to the gear unit 130 and the moving glass 20 at an upper portion of the motor housing 110 to move the moving glass 20 by the gear unit 130 in various embodiments.

The sun shade cable 150 is connected to the gear unit 130 and the sun shade 30 to wind or unwind the roller 32 through the operation of the gear unit 130 such that the sun shade 30 is moved at an upper portion of the glass cable 140.

As shown in FIG. 4 and FIG. 5, in various embodiments, the gear unit 130 includes a ring gear 132, a sun gear 134, a planetary gear 136, and a carrier 138, and these will be described as follows.

Firstly, the ring gear 132 is disposed on an interior circumference of the operating space 114 to be engaged with the worm 122.

The sun gear 134 is disposed at a rotation center of the ring gear 132, and a first cable gear 134a that engages with the sun shade cable 150 is disposed at one end portion that protrudes through the penetration hole 112.

Three planetary gears 136 are disposed based on the sun gear 134 between the ring gear 132 and the sun gear 134 at a predetermined distance from each other.

Here, each planetary gear 136 is arranged at an angle of 120° based on the sun gear.

The planetary gear 136 is engaged with an interior circumference of the ring gear 132 and an exterior circumference of the sun gear 134.

In a condition that the sun gear 134 is rotatably inserted, the carrier 138 supports each planetary gear 136, and a second cable gear 138a that engages with the glass cable 140 is formed thereon to protrude through the penetration hole 112 of the operating space 114.

A first cable gear 134a is positioned higher than the second cable gear 138a at an upper portion of the motor housing 110.

Accordingly, the glass cable 140 is disposed at a lower portion of the sun shade cable 150.

In various embodiments, a plurality of the glass cables 140 and a plurality of sun shade cables 150 are connected to both sides of the moving glass 20 and the sun shade 30 to be engaged with both sides of the first cable gear 134a and the second cable gear 138a.

Here, the glass cable 140 and the sun shade cable 150 are respectively engaged with the first cable gear 134a and the second cable gear 138a through spiral shape protrusions 142 and 152 that are integrally formed in a length direction of the exterior circumference thereof. One will appreciate that the protrusions may be monolithically formed on the cables.

That is, the glass cable 140 and the sun shade cable 150 are respectively engaged with the cable gears 134a and 138a through the spiral protrusions 142 and 152 to be moved in a front/rear direction according to the rotating direction of the cable gears 134a and 138a.

Meanwhile, a cover 116 can be disposed at a lower portion of the motor housing 110 in various embodiments.

In the gear unit 130 that is configured as described above, torque of the operating motor 120 is transferred to the ring gear 132 through the worm 122, the ring gear 132 is rotated thereby, and simultaneously each planetary gear 136 is rotated thereby.

Then, the sun gear 134 and the carrier 138 are rotated by the torque of the operating motor 120 through each planetary gear 136, wherein when one of the sun gear 134 and the carrier 138 is fixed, it has a structure that the non-fixed one is rotated.

That is, in the gear unit 130, if the sun gear 134 is fixed and the ring gear 132 is rotated, the planetary gear 136 is rotated based on the sun gear 134 to rotate the carrier.

In contrast, if the carrier 138 is fixed and the ring gear 132 is rotated, the planetary gear 136 of the carrier 138 rotates the sun gear 134.

The gear unit 130 can be a planetary gear that is applied to a transmission, and a detailed description thereof will be omitted.

Further, the locking unit 160 is disposed at an upper surface of the motor housing 110 corresponding to the gear unit 130, and the members of the gear unit 130 are selectively fixed (locked) such that the cables 140 and 150 are selectively operated.

As shown in FIG. 5, the locking unit 160 includes a locker 162, an operating portion 164, and an elastic member 166.

Firstly, the locker 162 is slidably disposed on the mounting hole 172 of the first plate 170 between the sun gear 134 and the carrier 138 that protrude to an upper portion of the motor housing 110.

The locker 162 has a square frame shape and slidably moves on the mounting hole 172 to selectively lock one of the sun gear 134 and the carrier 138.

Meanwhile, a first locking gear 134b that is formed on the sun gear 134 and a second locking gear 138b that is formed on the carrier 138 are formed between the first cable gear 134a and the second cable gear 138a.

Here, the locker 162 includes a first hook protrusion 162a that is formed at one end inner side corresponding to the first locking gear 134b and a second hook protrusion 162b that is formed at the other end inner side corresponding to the second locking gear 138b.

The first hook protrusion 162a includes at least one first hook 162c that is integrally formed thereon to be engaged with the first locking gear 134b. One will appreciate that the hook and hook protrusion may be monolithically formed.

The first hook 162c has one body to be engaged with the gear teeth of the first locking gear 134b such that the sun gear 134 is fixed (locked) when the locker 162 moves toward the first locking gear 134b.

Further, the second hook protrusion 162b includes at least one second hook 162d that is engaged with the second locking gear 138b.

The second hook 162d has three hooks that are engaged with gear teeth that are formed between four gears of the second locking gear 138b such that the sun gear 134 is fixed (locked) when the locker 162 moves toward the second locking gear 138b.

The second hook protrusion 162b has a larger diameter than that of the sun gear 134, and the number of second hooks 162d is larger than that of the first hooks 162c that are formed on the first hook protrusion 162a corresponding to the carrier 138 moving the moving glass 20 to offer a greater locking force to the carrier 138.

In various embodiments, the operating portion 164 is connected to one end of the locker 162 to move the locker 162 on the mounting hole 172 in one direction.

The operating portion 164 can be a solenoid type that moves the locker 162 toward the elastic member 166.

In various embodiments, when power is turned on, the operating portion 164 uses magnetic force that is formed therein to move a rod that is connected to the locker 162 forward and therefore the locker 162 is moved.

Also, the elastic member 166 is interposed between the mounting hole 172 and the other end of the locker 162 to offer an elastic force.

Here, one end of the elastic member 166 is supported by the mounting hole 172 and the other end thereof is supported by the locker 162, wherein the elastic member 166 is a coil spring.

The elastic member 166 is compressed by the moved locker 162 when the operating portion 164 is operated, and the elastic member 166 moves the locker 162 toward the operating portion 164 when the operation of the operating portion 164 is released.

The locking unit 160 having the structure as described above moves the locker 162 on the mounting hole 172 through the operating portion 164 and the elastic member 166 to lock one of the first locking gear 134b that is formed on the sun gear 134 and the second locking gear 138b that is formed on the carrier 138.

Hereinafter, an operation and effectiveness of an operating device for a sunroof of a vehicle according to various embodiments of the present invention will be described.

FIG. 6 to FIG. 9 show an operational state of an operating device for a sunroof of a vehicle according to various embodiments of the present invention.

Figure 6:
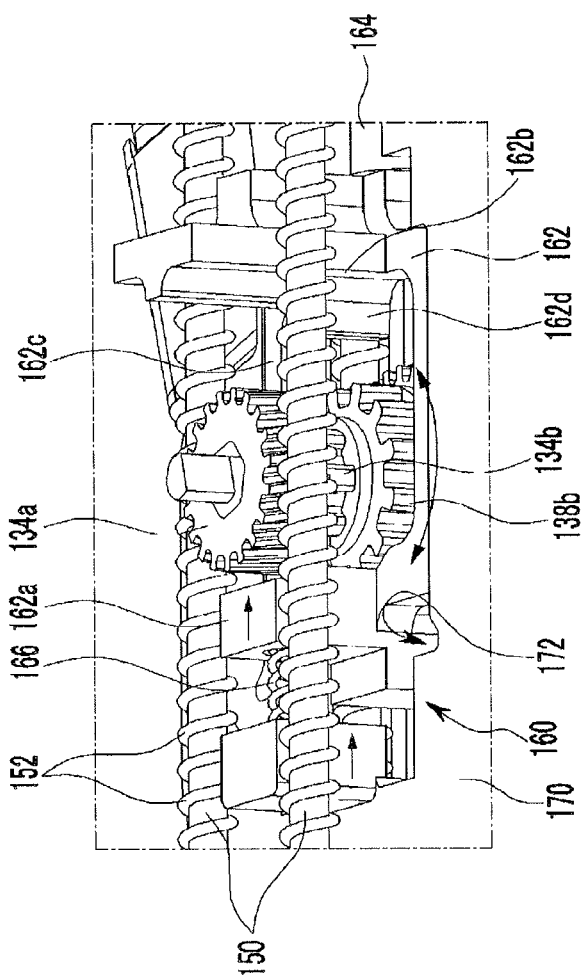
FIG. 6 to FIG. 9 show an operational state of an exemplary operating device for a sunroof of a vehicle according to the present invention.
Figure 7:
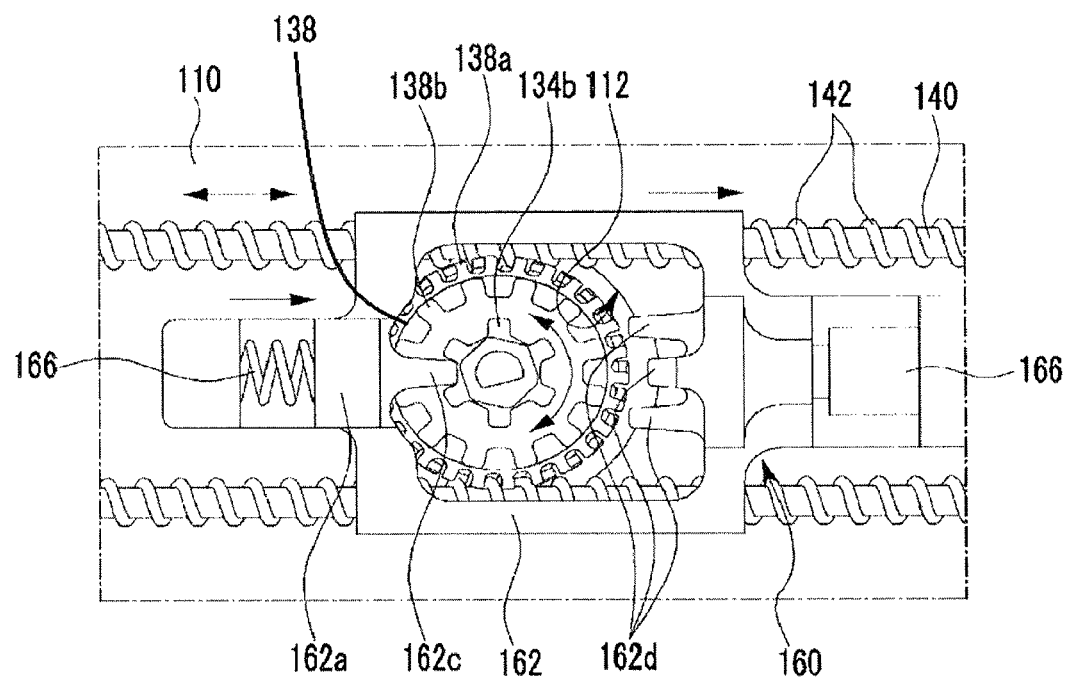

Firstly, as shown in FIG. 6 and FIG. 7, when the moving glass 20 is operated, the power is not supplied to the operating portion 164 of the locking unit 160 and the locker 162 moves toward the operating portion 164 by the elastic force of the elastic member 166.

Then, the locker 162 is engaged with the first locking gear 134b of the sun gear 134 through the first hook 162c that is formed on the first hook protrusion 162a to fix (lock) the second locking gear 134b.

Accordingly, the sun gear 134 is fixed. In this condition, if the drive motor 120 is operated, the ring gear 132 that receives the torque of the drive motor 120 through the worm 122 is rotated.

Here, the planetary gear 136 rotates the ring gear 132 and the sun gear 134 based on the fixed sun gear 134 to rotate the carrier 138.

Then, the second cable gear 138a is rotated together with the carrier 138 and the glass cable 140 that is engaged with both sides of the second cable gear 138a is moved according to the rotating direction of the carrier 138 in a condition that it is engaged through the spiral protrusion 142.

Accordingly, the moving glass 20 is slidingly moved outside the roof panel 10 to open/close the roof.

Figure 8:
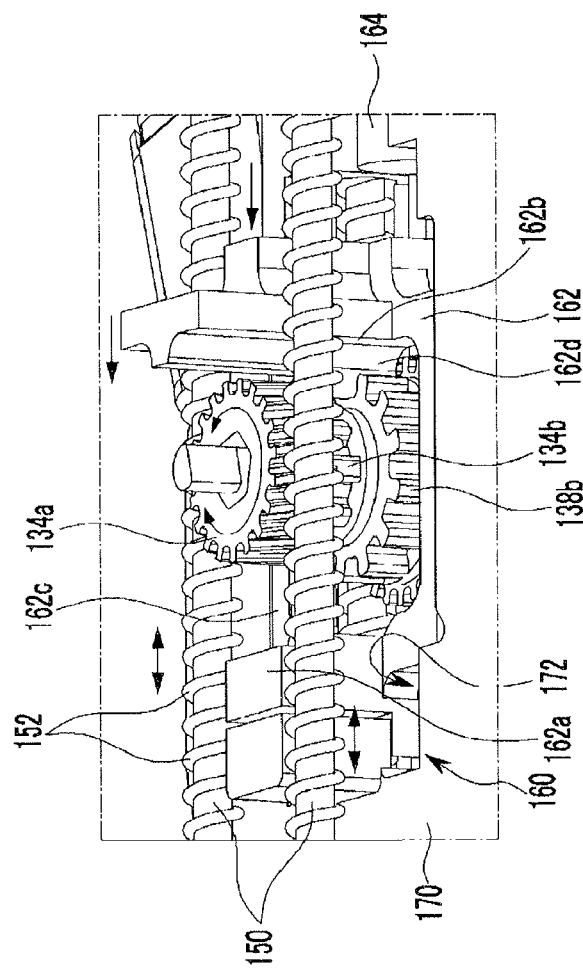
Figure 9:
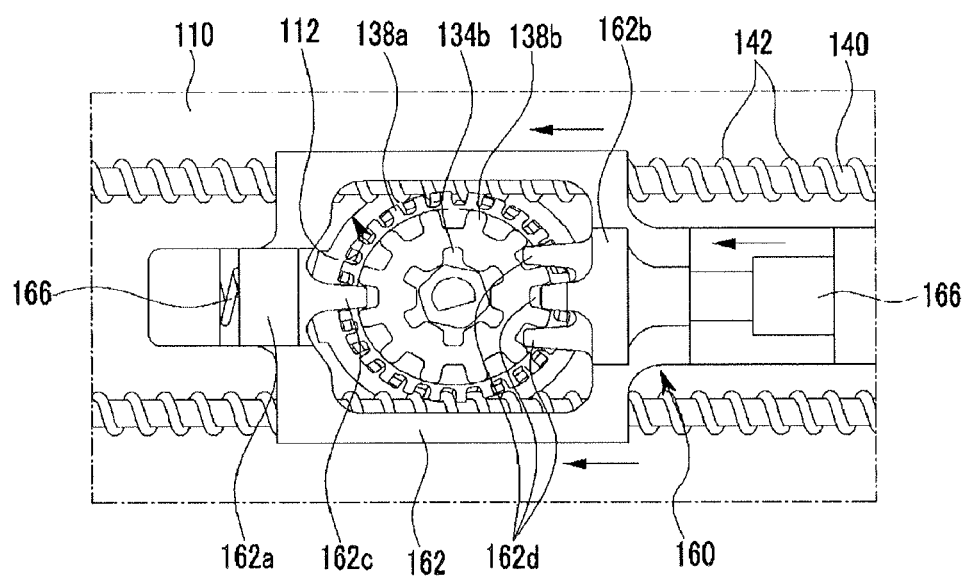

As shown in the FIG. 8 and FIG. 9, when the sun shade 30 is operated, power is supplied to the operating portion 164 of the locking unit 160 to move the locker 162 toward the elastic member 166.

Then, the locker 162 is engaged with the second locking gear 138b of the carrier 138 through the second hook 162d of the second hook protrusion 162b to lock the second locking gear 138b.

Accordingly, the carrier 138 is fixed. In this condition, if the drive motor 120 is operated, the ring gear 132 that receives the torque of the drive motor 120 through the worm 122 is rotated.

Here, the planetary gear 136 rotates in a fixed position by the carrier 138 to rotate the sun gear 134.

Then, the first cable gear 134a is rotated together with the sun gear 134 and the sun shade cable 150 that is engaged at both sides of the first cable gear 134a is moved according to the rotating direction of the sun gear 134 in a condition that it is engaged through the spiral protrusion 152.

Accordingly, the sun shade 30 is unwound/wound from/to the roller 32 inside the roof panel 10 to open/close the panorama sunroof.

Accordingly, in an operating device for a sunroof of a vehicle 100 according to various embodiments of the present invention as described above, one motor is used to operate each of the cables 140 and 150 that are respectively connected to the moving glass 20 and the shade 30 in a panorama sunroof that is disposed on the roof panel 10 of a vehicle such that the cost is reduced and the mounting space is secured to improve design freedom and interior space usage efficiency.

Also, the layout of each cable (140, 150) that is connected to the moving glass (20) and the sun shade (30) is reduced, a gear unit (130) for transferring torque of a motor is a type of a planetary gear device to improve the reliability thereof, the overall system is light in weight, and productivity is improved.

For convenience in explanation and accurate definition in the appended claims, the terms upper or lower, front or rear, inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An operating device for a sunroof of a vehicle, comprising:
    a motor housing disposed at a rear side of a roof panel and a mounting space having a penetration hole formed at one side of a lower surface;
    an operating motor disposed at one side of the motor housing and a worm disposed on a rotation shaft inserted into the mounting space;
    a gear unit rotatably disposed in the mounting space of the motor housing to be engaged with the worm of the operating motor and is rotated by the torque of the operating motor;
    a glass cable connected to the gear unit at an upper portion of the motor housing and connected to a moving glass disposed outside of the roof panel to move the moving glass;
    a sun shade cable connected to the gear unit at an upper side of the glass cable and connected to the sun shade disposed inside the roof panel to move the sun shade according to the operation of the gear unit; and
    a locking unit disposed at an upper surface of the motor housing corresponding to the gear unit and selectively locks the gear unit such that the cable is separately operated,
    wherein the gear unit includes:
        a ring gear disposed at an interior circumference side of the mounting space and is engaged with the worm;
        a sun gear disposed at a rotation center of the ring gear and a first cable gear formed at one end portion that protrudes to the penetration hole to be engaged with the sun shade cable;
        at least one planetary gear disposed between the ring gear and the sun gear with a predetermined distance to be engaged with the ring gear and the sun gear; and
        a carrier that supports the planetary gear in a condition that one end of the sun gear is rotatably inserted and a second cable gear engaged with the glass cable is formed at one surface to protrude to the penetration hole of the mounting space; and
    wherein the first cable gear is disposed at a higher position than the second cable gear at an upper portion of the motor housing.

2. The operating device of claim 1, comprising a plurality of glass cables and a plurality of sun shade cables, respectively connected to both sides of the moving glass and the sun shade to be engaged at both sides of the first cable gear and the second cable gear.

3. The operating device of claim 1, wherein the glass cable and the sun shade cable have a screw shape spiral protrusion integrally formed on the exterior circumference thereof along the length direction to be respectively engaged with the first cable gear and the second cable gear.

4. The operating device of claim 1, wherein the glass cable movably penetrates the upper portion of the motor housing, a first plate having a mounting hole corresponding to the penetration hole is disposed thereon, and a second plate that the sun shade cable movably penetrates is disposed at an upper portion of the first plate.

5. The operating device of claim 4, wherein the locking unit includes:
- a locker slidably disposed in the mounting hole across the carrier and the sun gear that protrudes upward of the motor housing to selectively connect the sun gear with the carrier;
- an operating portion connected to one end of the locker to slidably move the locker on the mounting hole in one direction; and
- an elastic member interposed between the mounting hole and the other end portion of the locker to apply an elastic force to the locker.

6. The operating device of claim 5, wherein the first locking gear formed on the sun gear and the second locking gear formed on the carrier are disposed between the first cable gear and the second cable gear.

7. The operating device of claim 6, wherein the locker includes a first hook protrusion formed at one end inner side corresponding to the first locking gear and a second hook protrusion formed at the other end inner side corresponding to the second locking gear.

8. The operating device of claim 7, wherein the first hook protrusion has at least one first hook engaged with the first locking gear.

9. The operating device of claim 7, wherein the second hook protrusion has a hook engaged with the second locking gear.

10. The operating device of claim 5, wherein the operating portion is a solenoid type that moves the locker toward the elastic member depending on the power supply.

11. The operating device of claim 5, wherein the elastic member is a coil spring of which one end thereof is supported by the mounting hole and the other end thereof is supported by the locker.

* * * * *